March 20, 1951     P. B. BLANCHARD     2,545,760
PROTECTIVE FILTER CONDENSER UNIT
Filed Feb. 17, 1948
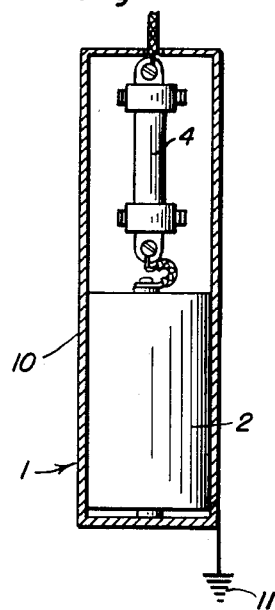
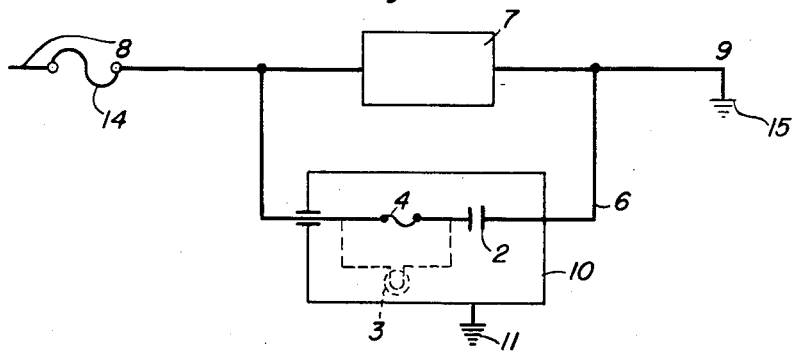
Pearl B. Blanchard
INVENTOR.

Patented Mar. 20, 1951

2,545,760

UNITED STATES PATENT OFFICE 2,545,760

PROTECTIVE FILTER CONDENSER UNIT

Pearl B. Blanchard, Franklin, Mass.

Application February 17, 1948, Serial No. 8,802

2 Claims. (Cl. 177—311)

This invention relates to protective filter devices used in connection with electrically operated devices, such as electric motors, generators, or any other electricity consuming or producing apparatus, and it has for its main object to prevent the complete disabling of the apparatus by the burning out of the main fuse as a result of a defect which develops merely in the protective circuit.

A further object of the invention consists in providing an easily replaceable filter condenser unit, containing not only the condenser but also an indicator lamp and a grounded casing which may be connected with the protective shunt circuit and while furnishing all the required protection to the main circuit, indicates clearly any defect which may occur within the unit, and prevents an action on the main circuit which is merely due to a defect in the protective device.

A further object of the invention consists in providing a unit containing the filter condenser and the indicator lamp in series within a grounded metal casing, one of the condenser plates being connected with the indicator lamp, the other with the grounded casing, thus producing a series connection which does not produce any signal as long as the condenser is operating normally, but which furnishes a lamp signal whenever the condenser carries a leakage current.

A further object of the invention consists in placing the above described unit into the shunt circuit, arranged in parallel to the device to be protected in such a manner that burning out of a fuse member contained in said unit disconnects the portion of the circuit which is under tension from the portion which is grounded.

Further objects will be apparent from the following detailed specification.

The invention is described with reference to the drawing illustrating an embodiment of the invention by way of example. As this example is not the sole embodiment of the invention, but merely serves to explain the principle of the invention and the preferred mode in which it is contemplated applying said principle, it will be clear that modifications of the example shown are not necessarily departures from the invention.

In the accompanying drawing:

Figure 1 is an elevational sectional view of the unit.

Figure 2 is a diagram illustrating the connection of the device.

As above explained, many electrical apparatus, machine systems and devices are provided with a by-pass or shunt, containing a condenser, usually called filter condenser. This is done for various reasons, the most frequent reason being to provide a path of small resistance for high frequency currents which carries these currents to ground and thereby protects the apparatus, machine system or device itself against such currents. Sometimes these high frequencies are generated outside and sometimes in the machine, apparatus or device itself, either as a harmonic of an A. C. produced in the system or as a consequence of spark or arc formation. In other cases it is necessary to suppress the noises caused by said machine, apparatus or system in near by radio apparatus. In all these and other cases the high frequency currents are parasitic and merely interfere or might interfere with the proper function of the machine or apparatus itself or of other apparatus operated in the vicinity.

The protective branch containing the filter condensers is usually grounded, one condenser plate being customarily directly connected with ground in order to get rid of the parasitic current on as short a path as possible, thus avoiding further induction of parasitic currents.

Let it first be assumed that the machine or appliance 7 supplied with current by means of supply line 8 and connected at the other side with line 9 which is grounded at 15 is merely protected in the usual way by a condenser.

A grounded branch, such as 9 with a condenser arranged in parallel to an apparatus, machine or the like 7, which is separated from the live supply line of the apparatus or machine merely by a condenser, carries with it the danger that every defect of or leakage through the condenser produces a so-called "dead" short circuit in which current from the high tension side 8 flows directly to the grounded side 9, 15. Such a short circuit burns out the fuse 14 of the apparatus 7 located in the main circuit 8, 9 and puts it out of service.

This burning of the fuse 14 may occur under conditions in which the leakage or defect in the condenser is not sufficiently serious to put the apparatus out of service by itself. A relatively small defect in the protective arrangement therefore may produce a sometimes rather costly and serious interruption.

According to the invention, a special unit 1 is formed which includes the condenser 2 and a signal lamp which may act as a fuse. In some cases a separate or additional lamp 3 may be added which is preferably connected in parallel to the fuse 4 as indicated in dotted lines. The signal lamp and fuse (whether forming a single unit or two separate units) are connected with the protective circuit 6, which is arranged in parallel to the apparatus, machine or other device 7 and which is connected with the main lines 8 and 9.

The unit 1 is contained in an outer metal casing 10 which is grounded at 11. The condenser plate connected with the grounded line 9 of the apparatus 7 is preferably directly connected with said casing, while the other condenser plate, as above stated, is connected with the indicating fuse or with the indicating lamp and fuse aggregate which, in its turn, is connected with the protective or by-pass circuit 6.

A minor defect in the condenser therefore merely lights the signal lamp as current may now flow through this branch on account of the leaky condenser. A major defect may burn out the lamp (if acting as a fuse) or the special fuse 4 but it also cuts the connection of the high tension side 8 with the ground 15 established by the filter condenser unit and thus puts the shunt circuit 6 out of operation.

The protective circuit, therefore, does not produce a stoppage of the operation of the main circuit.

In the majority of cases moreover the existence of a leakage is indicated by the lamp and the unit may be replaced. No serious short circuit or defect need therefore occur, if supervision is constantly exercised.

The unit has the advantage that it may be readily removed and replaced thereby simultaneously placing a fresh condenser and a fresh lamp bulb in the shunt circuit.

It will be understood that a change of the unessential construction details do not affect the invention.

Having described the invention, what is claimed as new is:

1. A protective filter condenser unit for grounded machines and appliances, adapted to be connected with the grounded side and the live supply line of the machine or appliance containing the protective fuse for the said machine or appliance, comprising a metallic casing connected with the ground and with the grounded side of the machine or appliance, said casing containing a condenser, one side of which is connected with the casing and further containing a special protective and indicative device with a fusible member connected with the second side of the condenser and with the supply line for the machine or apparatus containing the main fuse, said protective filter condensing unit forming a shunt around the machine or appliance and connecting the supply and the grounded side of the same, the indicative and protective device of the filter condenser unit cutting the connection between the main fuse containing supply line and the grounded line of the apparatus or machine established by the said filter condenser unit in the event of a major condenser leakage and indicating the defect in the event of a minor leakage.

2. A protective filter condenser unit for grounded machines and appliances as claimed in claim 1 wherein the protective and indicative device consists of a fuse and an indicating lamp connected in parallel.

PEARL B. BLANCHARD.

REFERENCES CITED

The following references are of record in the file of this patent:

UNITED STATES PATENTS

| Number | Name | Date |
| --- | --- | --- |
| 1,973,520 | Belt | Sept. 11, 1934 |
| 2,037,062 | Brach | Apr. 14, 1936 |
| 2,294,099 | Trapp | Aug. 25, 1942 |